US009694715B1

United States Patent
Gebauer et al.

(10) Patent No.: US 9,694,715 B1
(45) Date of Patent: Jul. 4, 2017

(54) REMOVABLE VEHICLE SEAT ASSEMBLY HAVING ANGLED STRIKER SURFACE

(71) Applicants: Michael P Gebauer, Imlay City, MI (US); Jason Bahlman, Shelby Township, MI (US); Sumit Mathur, Troy, MI (US)

(72) Inventors: Michael P Gebauer, Imlay City, MI (US); Jason Bahlman, Shelby Township, MI (US); Sumit Mathur, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/972,275

(22) Filed: Dec. 17, 2015

(51) Int. Cl.
*B60N 2/01* (2006.01)
*B60N 2/015* (2006.01)
*B60N 2/44* (2006.01)

(52) U.S. Cl.
CPC ....... *B60N 2/01516* (2013.01); *B60N 2/4435* (2013.01)

(58) Field of Classification Search
CPC B60N 2/01516; B60N 2/01583; B60N 2/442; B60N 2/4435
See application file for complete search history.

(56) References Cited

U.S. PATENT DOCUMENTS

| 89,276 | A | * | 4/1869 | Beers | B60N 2/01583 |
| | | | | | 248/503.1 |
| 4,759,580 | A | * | 7/1988 | Berklich, Jr. | B60N 2/01583 |
| | | | | | 248/503.1 |
| 5,125,711 | A | * | 6/1992 | Syed | B60N 2/01583 |
| | | | | | 248/503.1 |
| 5,238,285 | A | * | 8/1993 | Holdampf | B60N 2/01583 |
| | | | | | 248/503.1 |
| 5,282,662 | A | * | 2/1994 | Bolsworth | B60N 2/01583 |
| | | | | | 296/65.03 |
| 5,372,398 | A | * | 12/1994 | Aneiros | B60N 2/01591 |
| | | | | | 248/430 |

(Continued)

FOREIGN PATENT DOCUMENTS

CZ DE 102006026782 A1 * 1/2007 ......... B60N 2/01583
DE 4404935 A1 * 8/1995 ......... B60N 2/01583

(Continued)

*Primary Examiner* — Glenn Dayoan
*Assistant Examiner* — Paul Chenevert
(74) *Attorney, Agent, or Firm* — Ralph E. Smith

(57) ABSTRACT

A seat assembly includes a removable vehicle seat having a front latch, a rear latch, and a seat mounting bracket adapted to be coupled to a vehicle floor. The front latch includes a striker receiving slot having a slot width, and the seat mounting bracket includes a front and rear striker, where the front striker is configured to be received in the receiving slot. The front striker includes an engagement portion having a flat, angled engagement surface in cross-section. In an installation position of the seat, the front latch receives the engagement portion with the engagement surface being substantially parallel to the receiving slot thereby providing for a clearance fit. In an installed position of the seat, the receiving slot is angled relative to the engagement surface such that the front striker engages opposing walls of the receiving slot thereby establishing an interference fit between the striker and front latch.

14 Claims, 4 Drawing Sheets

(56) References Cited

U.S. PATENT DOCUMENTS

| | | | |
|---|---|---|---|
| 5,765,894 A * | 6/1998 | Okazaki | B60N 2/01583 296/65.03 |
| 5,775,763 A * | 7/1998 | Glinter | B60N 2/01583 296/65.03 |
| 6,056,346 A * | 5/2000 | Smuk | B60N 2/01591 248/429 |
| 6,405,988 B1 * | 6/2002 | Taylor | B60N 2/01516 248/429 |
| 6,644,730 B2 * | 11/2003 | Sugiura | B60N 2/01583 296/65.09 |
| 6,974,173 B2 | 12/2005 | Yokoyama et al. | |
| 7,066,539 B2 * | 6/2006 | Hatta | B60N 2/01583 296/65.09 |
| 7,108,305 B2 | 9/2006 | Frazier et al. | |
| 7,404,605 B2 | 7/2008 | Inoue et al. | |
| 7,775,578 B2 * | 8/2010 | McDermott | B60N 2/01583 296/65.03 |
| 8,251,450 B2 * | 8/2012 | Carroll | B60N 2/01583 297/331 |
| 8,840,187 B2 | 9/2014 | Seibold et al. | |
| 2013/0076049 A1 * | 3/2013 | Buchner | B60N 2/01583 292/340 |
| 2013/0169021 A1 | 7/2013 | Jinno et al. | |
| 2013/0249220 A1 | 9/2013 | Paskonis | |
| 2014/0333113 A1 * | 11/2014 | Izawa | B60N 2/68 297/463.1 |

FOREIGN PATENT DOCUMENTS

| | | | | |
|---|---|---|---|---|
| DE | 102006021887 A1 * | 11/2007 | | B60N 2/01583 |
| FR | 2698592 A1 * | 6/1994 | | B60N 2/0155 |

* cited by examiner

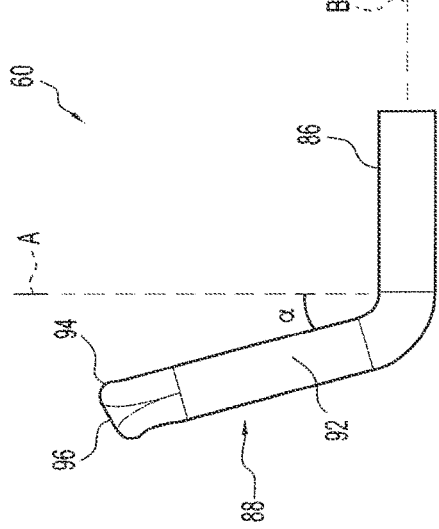
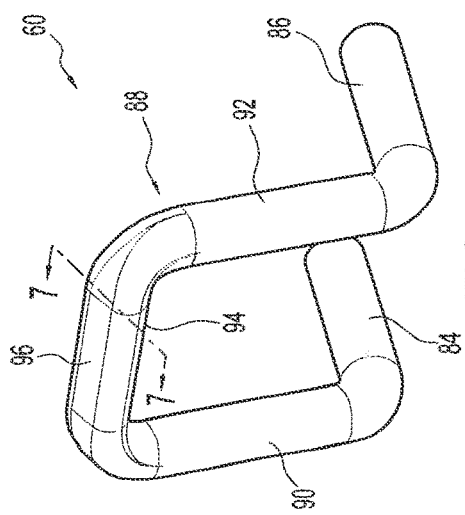
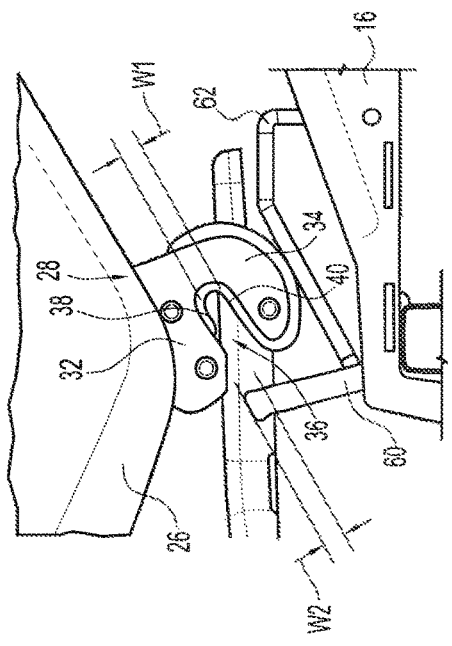
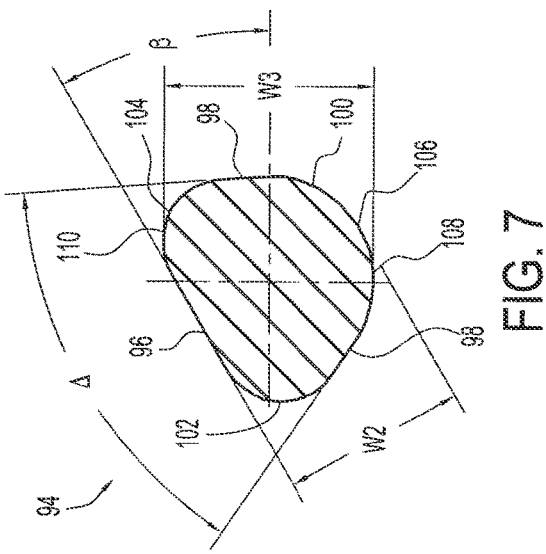

REMOVABLE VEHICLE SEAT ASSEMBLY HAVING ANGLED STRIKER SURFACE

FIELD

The present application relates generally to a seat assembly for a vehicle and, more particularly, to a removable seat assembly that includes a striker with an angled install/removal surface.

BACKGROUND

Some conventional vehicles have a rear passenger area that includes one or more rows of bucket or split bench seats. Some of these seats, such as a center seat, can be removable in order to maximize cargo space behind the front seats and/or provide access to a rear or third row of seats. A typical removable seat assembly includes front and rear anchors, which are mounted to the floor of the passenger compartment. The seat also includes latches that are configured to engage or disengage the anchors to allow installation or removal of the seat. However, such latch and anchor arrangements, especially when designed to have an interference fit between the latch and anchor/striker, increase installation and removal efforts of the associated seat. Accordingly, while such conventional removable seat assemblies work for their intended purpose, it is desirable to provide an improved assembly that is easier to install and remove.

SUMMARY

According to one example aspect of the invention, a removable seat assembly for a vehicle is provided. In an exemplary implementation, the seat assembly includes a vehicle seat having a front latch, a rear latch, and a seat mounting bracket adapted to be coupled to a floor of the vehicle. The front latch includes a striker receiving slot having a slot width, and the seat mounting bracket includes a front striker and a rear striker. The front striker is configured to be received in the striker receiving slot, and the rear striker is configured to be received by the rear latch. The front striker includes a front striker engagement portion having a generally flat, angled engagement surface in cross-section. The engagement portion includes a first cross-sectional width in a direction perpendicular to the engagement surface that is less than a second, different cross-sectional width. In an installation position of the vehicle seat where the seat is angled forward relative to the vehicle floor such that the rear latch is spaced apart from the rear striker, the front latch is configured to receive the engagement portion of the striker such that the first cross-sectional width of the engagement portion is received in the striker receiving slot and the engagement surface is substantially parallel to the striker receiving slot thereby providing for a clearance fit between the front striker and the receiving slot when initially installing the vehicle seat. In an installed position of the vehicle seat where the rear latch is engaged with the rear striker, the striker receiving slot is angled relative to the striker engagement surface such that the front striker engages opposing walls of the striker receiving slot at the second cross-sectional width of the front striker thereby establishing an interference fit between the front latch and the striker engagement portion when the vehicle seat is rotated about the front striker to the installed position.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 5 is a perspective view of an exemplary striker of the seat mounting bracket assembly shown in FIG. 4 in accordance with the principles of the present disclosure;

FIG. 6 is a side view of the striker shown in FIG. 5 in accordance with the principles of the present disclosure;

FIG. 7 is a sectional view of the striker shown in FIG. 5 and taken along line 7-7 in accordance with the principles of the present disclosure;

FIG. 8 is an enlarged front side view of a portion of the removable vehicle seat assembly shown in FIG. 3 in accordance with the principles of the present disclosure;

DETAILED DESCRIPTION

Figure 1:
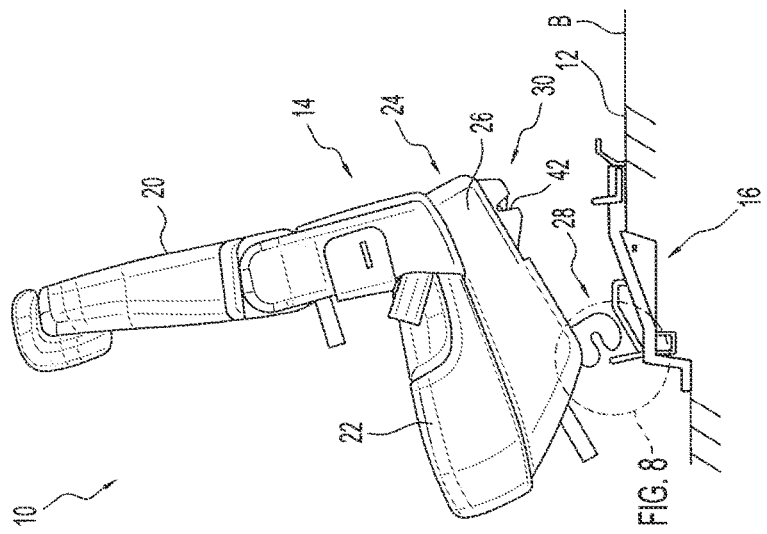
FIG. 1 is a side view of an exemplary removable vehicle seat assembly in a first position in accordance with the principles of the present disclosure.
Figure 2:
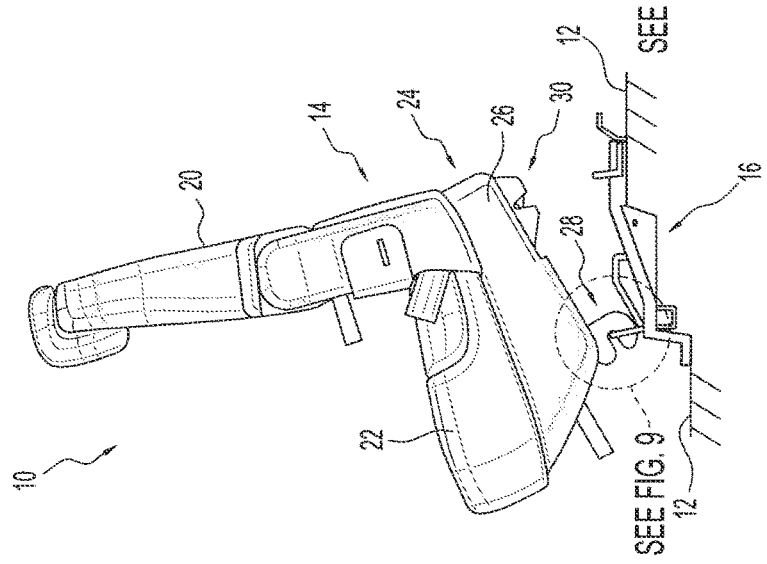
FIG. 2 is a side view of the removable vehicle seat assembly shown in FIG. 1 in a second position in accordance with the principles of the present disclosure.
Figure 3:
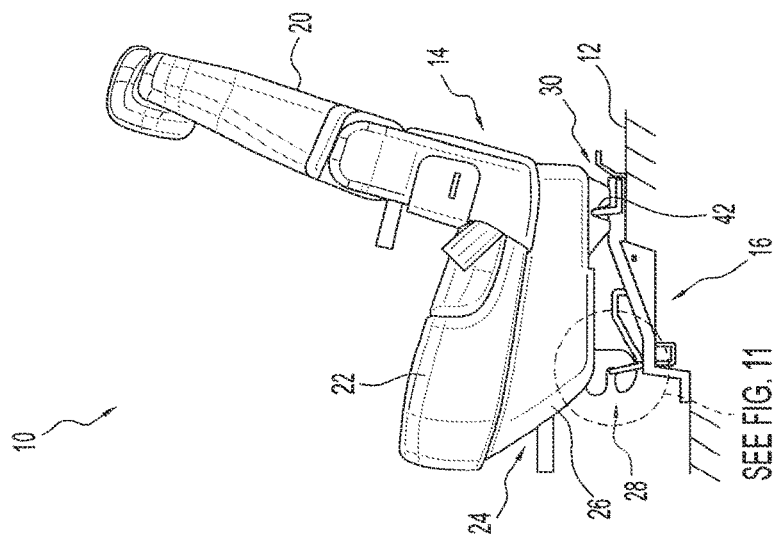
FIG. 3 is a side view of the removable vehicle seat assembly shown in FIGS. 1 and 2 in a third position in accordance with the principles of the present disclosure.

With initial reference to FIGS. 1-3, an example removable seat assembly of a vehicle is illustrated and generally identified at reference numeral 10. The seat assembly 10 is configured to be removably coupled to a vehicle frame and/or floor 12. In an exemplary implementation, the seat assembly 10 is configured as a second-row jump seat. For example, the seat assembly 10 may be removed from the vehicle to provide increased cargo space and/or a pass-through path to a third row of seating. If seating for an additional passenger is desired, the seat assembly 10 may be quickly installed in the vehicle without the need for tools. However, the removable seat assembly 10 is not limited to second-row seating and may be used in various other vehicles or seating arrangements.

In one exemplary implementation, the vehicle seat assembly 10 generally includes a vehicle seat 14 and a seat mounting bracket 16. The seat mounting bracket 16 is coupled to the vehicle floor 12, and the vehicle seat 14 is removably coupled to the seat mounting bracket 16, as described herein in more detail.

In the exemplary implementation, the vehicle seat 14 generally includes a seat back 20, a seat bottom 22, and a seat riser 24. The seat back 20 is coupled to the seat bottom 22, which is coupled to the seat riser 24. In some implementations, seat back 20 may be pivotally coupled to the seat bottom 22.

The seat riser 24 includes a riser structure 26, opposed front latches 28 and opposed rear latches 30 (only one shown). The front latches 28 and the rear latches 30 are configured to couple to the seat mounting bracket 16 to thereby removably couple the vehicle seat 14 to the mounting bracket 16. With additional reference to FIG. 8, each front latch 28 includes an upper portion 32, a lower portion 34, and a striker receiving slot 36 defined therebetween. The upper portion 32 is coupled to and extends from the riser structure 26, and the lower portion 34 is coupled to and extends from the upper portion 32. The striker receiving slot 36 is at least partially defined by opposed edges 38 and 40, which are spaced apart by a width W1 sized to receive and selectively and interferingly engage a striker 60 of the seat mounting bracket 16. Each rear latch 30 includes an opening 42 configured to receive and retain rear strikers 58.

Figure 4:
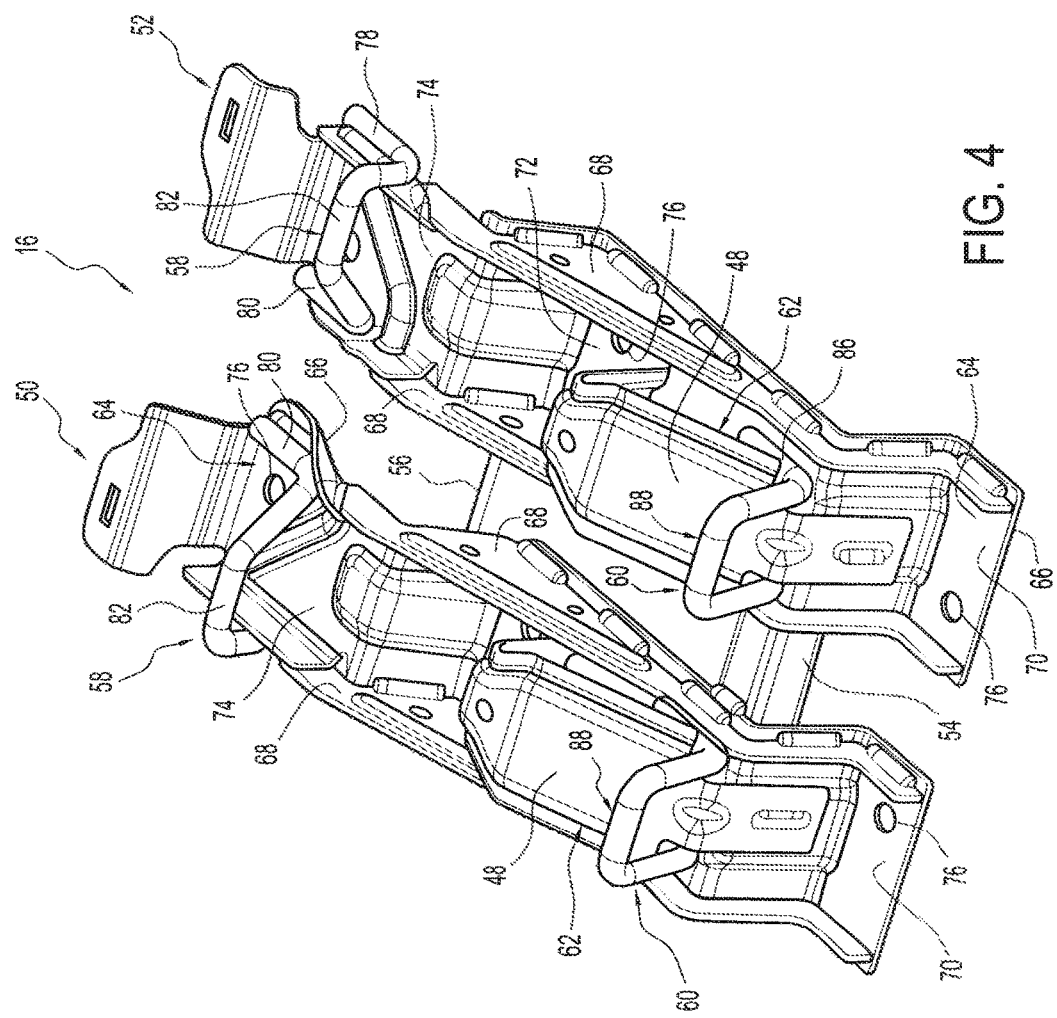
FIG. 4 is a perspective view of an exemplary seat mounting bracket assembly associated with the removable vehicle seat assembly shown in FIGS. 1-3 in accordance with the principles of the present disclosure.

With additional reference to FIG. 4, the seat mounting bracket 16 is configured to couple to the vehicle floor 12 and generally includes left and right side members 50 and 52, a support tube 54, a support wire 56, rear strikers 58, front strikers 60, and left and right ramped brackets 62 having guide surfaces 48 configured to guide the front latch 28 toward and away from the front strikers 60.

In the example implementation, the side members 50, 52 are coupled to and spaced apart by the support tube 54 and/or the support wire 56. Each of the side members 50, 52 includes an outer or top surface 64, an opposed inner or bottom surface 66, and sidewalls 68. The top surface 64 may be stepped to define a lower surface 70, an intermediate surface 72, and an upper surface 74.

The bottom surface 66 is configured to be disposed against the vehicle floor 12. The lower surface 70, the intermediate surface 72, and the upper surface 74 may each include one or more apertures 76 configured to receive a fastener (not shown) such as a bolt for coupling the seat mounting bracket 16 to the vehicle floor 12. However, the seat mounting bracket 16 may be coupled to the vehicle floor 12 in any suitable manner such as, for example, by welding.

Each rear striker 58 is fabricated as a striker wire having a first leg 78, a second leg 80, and an engagement portion 82. In the illustrated example, the first leg 78 is coupled to the sidewall 68, and the second leg 80 is coupled to the upper surface 74 of top surface 64. The engagement portion 82 is coupled between legs 78, 80, which extend outwardly from the top surface 64 such that the engagement portion 82 is positioned for selective engagement with the rear latch 30.

With additional reference to FIGS. 5-7, in one exemplary implementation, each front striker 60 is fabricated as a striker wire having a first leg 84, a second leg 86, and an engagement portion 88 coupled therebetween. The first and second legs 84, 86 are coupled to the intermediate surface 72 of the side member top surface 64. The engagement portion 88 extends outwardly from legs 84, 86 and the intermediate surface 72 such that the engagement portion 88 is positioned for selective engagement with the front latch 28. In the illustrated implementation, the engagement portion 88 is generally U-shaped. However, various other shapes and configurations are envisioned for engagement portion 88.

As illustrated in FIGS. 5-7, the engagement portion 88 includes a first stem portion 90 and a second stem portion 92 coupled by a connecting portion 94. As shown in FIG. 6, stem portions 90, 92 extend from legs 84, 86 at an angle α relative to an axis 'A', which is perpendicular to or substantially perpendicular to a horizontal axis 'B' of both legs 84, 86 and the vehicle floor 12. In one example, angle α is between approximately 20° and 40°. In another example, angle α is between 20° and 40°. In yet another example, angle α is between approximately 28° and approximately 32° or between 28° and 32°. In yet another example, angle α is approximately 30°. In yet another example, angle α is 30°.

In the exemplary implementation, stem portions 90, 92 are rounded or generally cylindrical with a circular cross-section, and the connecting portion 94 is formed with an angled, flat or generally flat surface 96 in cross-section. As discussed in greater detail herein, the innovative front striker 60 with angled flat surface 96 provides for the seat assembly 10 to be installed/removed with no interference between the striker and receiving slot 36 of front latch 28, and then subsequently rotated to a seating position where front striker 60 engages receiving slot 36 in an interference configuration. This provides for, among other advantages, easy installation and removal efforts as well as a secure interference fit in a seating position of the seat thereby eliminating any potential buzz, squeak and rattle (BSR) and/or noise, vibration, and harshness (NVH) related issues.

The generally flat surface 96 may be formed, for example, by swaging or other similar technique. When front striker 60 is coupled to the seat mounting bracket 16, flat surface 96 is oriented at an angle β relative to the horizontal axis 'B' of the vehicle floor 12. In one example, angle β is between approximately 20° and approximately 40°. In another example, angle β is between 20° and 40°. In yet another example, angle β is approximately 30°. In yet another example, angle β is 30°.

As shown in FIG. 7, a cross-section of the connecting portion 94 includes generally flat sidewall portions 98 coupled or connected to each other by an intervening first generally rounded portion 100. The sidewall portions 98 are each respectively coupled or connected to the flat surface 96 by second and third generally rounded portions 102, 104. In one example, the opposed sidewall portions 98 extend outwardly from each other at an angle Δ. In one example, angle Δ is between approximately 40° and approximately 60°. In another example, angle Δ is between 40° and 60°. In yet another example, angle Δ is approximately 50°. In yet another example, angle Δ is 50°.

With continued reference to FIG. 7, the cross-section of the connecting portion 94 is further defined by a first cross-sectional width W2 between an outermost point 106 of the rounded portion 100 and the flat surface 96, and by a cross-sectional width W3 between a point 108 of the first rounded portion 100 and a point 110 of the third rounded portion 104. Points 108 and 110 are located at positions along their respective rounded portions 100 and 104 that provide the farthest distance therebetween. In one exemplary implementation, the cross-sectional width W2 is perpendicular to or substantially perpendicular to the flat, angled surface 96, as shown for example in FIG. 7.

Figure 10:
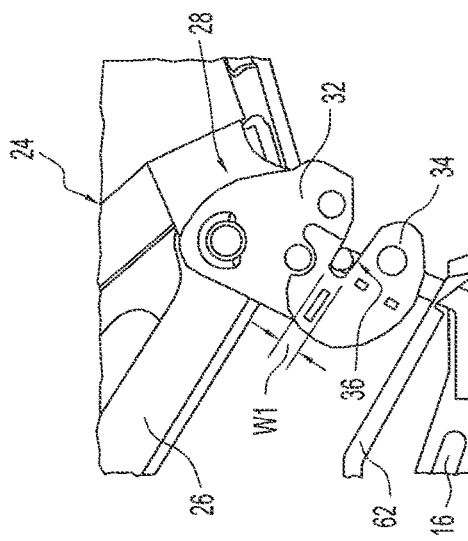
FIG. 10 is a rear side cross-sectional view of the portion of the removable vehicle seat assembly shown in FIG. 9 in accordance with the principles of the present disclosure.
Figure 12:
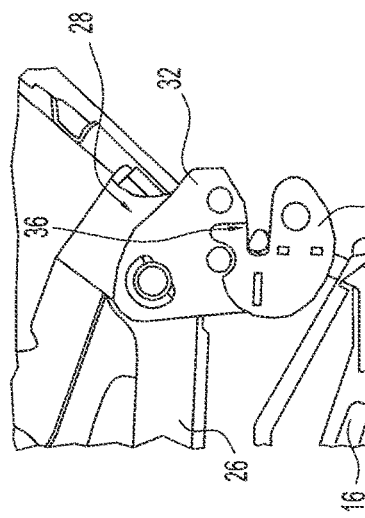
FIG. 12 is a rear side cross-sectional view of the portion of the removable vehicle seat assembly shown in FIG. 11 in accordance with the principles of the present disclosure.
Figure 9:
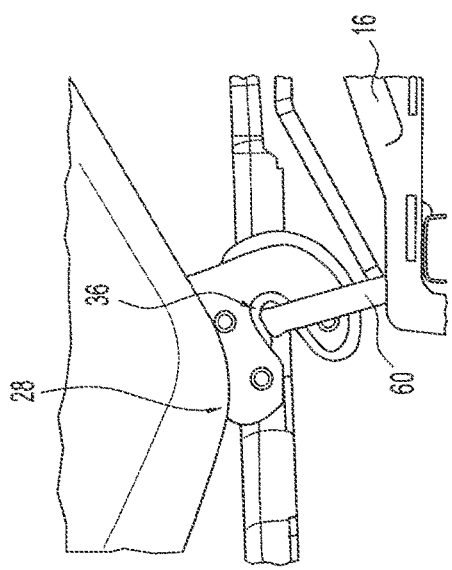
FIG. 9 is an enlarged front side view of a portion of the removable vehicle seat assembly shown in FIG. 2 in accordance with the principles of the present disclosure.
Figure 11:
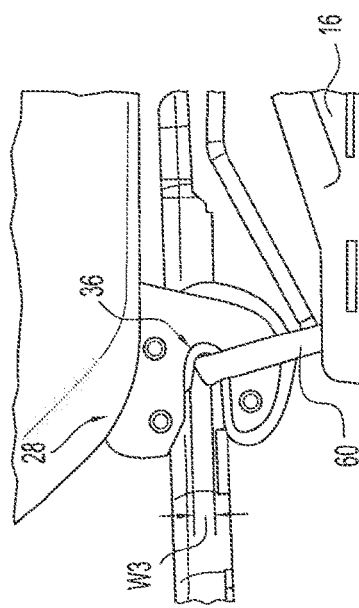
FIG. 11 is an enlarged front side view of a portion of the removable vehicle seat assembly shown in FIG. 1 in accordance with the principles of the present disclosure.

In the exemplary implementation, the cross-sectional width W3 is greater than the opening width W1 of the front latch striker receiving slot 36, which is greater than the cross-sectional width W2. As such, during installation or removal of seat 14, the striker receiving slot 36 can be oriented to receive the front striker 60 cross-sectional width W2 with little or no interference (see FIG. 10). Subsequently, the seat 14 can be rotated such that receiving slot 36 is rotated about the front striker 60 to the cross-sectional width W3, thereby establishing an interference fit between the front latch 28 and the front striker 60 when seat assembly 10 is in a final installed or seating position with rear latches 30 engaging the rear strikers 58 (see FIG. 12).

With additional reference to FIGS. 8-12, the vehicle seat 14 can be installed at the installation angle by orienting the vehicle seat 14 and thus the front latches 28 in a first installation/removal position (FIGS. 3 and 8) at the angle of orientation of the front striker flat surface 96 (e.g., at angle β). In one exemplary implementation, this angle of orientation can correspond to flat surface 96 (or a plane parallel thereto) being parallel to upper edge 38 (or a plane parallel thereto), which will provide a slip or clearance fit between striker 60 and latch 28.

The vehicle seat 14 is subsequently moved toward the front strikers 60 to a second position (FIGS. 2, 9, 10) such that the connecting portions 94 of the front strikers 60 are received within the striker receiving slots 36 of the front latches 28. In this orientation, the striker receiving slot 36 receives the connecting portion 94 at an orientation where the connecting portion 94 has the cross-sectional width W2 between the opening width W1 of the receiving slot 36. Because width W2 is less than width W1, the front striker 60 can be easily positioned within the striker receiving slot 36 with little or no contact (i.e., clearance fit) with opposed edges 38, 40.

To complete the installation, the vehicle seat is subsequently rotated rearward to an installed/seating third position (FIGS. 1, 11, 12) such that the rear latches 30 receive and couple to the rear strikers 58, thereby securing the vehicle seat 14 to the seat mounting bracket 16. During the rearward rotation, the front latches 28 and striker receiving slots 36 are rotated about the fixed front striker 60 to an orientation where the connecting portion 94 has the cross-sectional width W3 between the opening width W1 of the receiving slot 36. Because the opening width W1 is smaller than the cross-sectional width W3, an interference is created between the connecting portion 94 (at points 108, 110) and the opposed edges 38, 40 of the front latch 28. In this installed position, the plane of upper edge 38 is not parallel to the plane of striker flat surface 96, and opposed edges 38, 40 do not contact striker flat surface 96.

To remove the vehicle seat 14, an unlatching mechanism (not shown) is actuated to disengage the rear latches 30 from the rear strikers 58. The vehicle seat 14 is subsequently rotated forward from the position shown in FIG. 1 to the position shown in FIG. 2, which is where the seat 14 is positioned such that slot 36 is oriented at or substantially at angle β. The vehicle seat 14 is then moved upward and rearward to the FIG. 3 position such that front strikers 60 are removed from within the striker receiving slots of the front strikers 60. The vehicle seat 14 may then be removed from the vehicle or moved to another location within the vehicle.

Described herein are system and methods for installation and removal of a vehicle seat. A seat assembly includes a vehicle seat with front latches removably coupled to a seat mounting bracket. The seat mounting bracket includes front strikers having a flat, angled surface that enables the vehicle seat to be oriented in an installation/removal position with front latches to receive the striker with little or no interference. The vehicle seat is subsequently rotated to an installed position to create an interference fit between the front latches of the vehicle seat and the front strikers. Accordingly, the selective interference fit can reduce or prevent unwanted noise, improve lateral slide performance, and ease large user efforts during install and removal of the seat. As such, this innovation overcomes disadvantages associated with conventional circular striker arrangements.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A removable seat assembly for a vehicle, the seat assembly comprising:
   a vehicle seat having a front latch and a rear latch, the front latch including a striker receiving slot having a slot width; and
   a seat mounting bracket adapted to be coupled to a floor of the vehicle, the seat mounting bracket including a front striker and a rear striker, the front striker configured to be received in the striker receiving slot, and the rear striker configured to be received by the rear latch, the front striker comprising a front striker engagement portion including a generally flat, angled engagement surface in cross-section, wherein the engagement portion includes a first cross-sectional width in a direction perpendicular to the engagement surface that is less than a second, different cross-sectional width,
   wherein in an installation position of the vehicle seat where the seat is angled forward relative to the vehicle floor such that the rear latch is spaced apart from the rear striker, the front latch is configured to receive the engagement portion of the front striker such that the first cross-sectional width of the engagement portion is received in the striker receiving slot and the engagement surface is substantially parallel to the striker receiving slot thereby providing for a clearance fit between the front striker and the receiving slot when initially installing the vehicle seat, and
   wherein in an installed position of the vehicle seat where the rear latch is engaged with the rear striker, the striker receiving slot is angled relative to the striker engagement surface such that the front striker engages opposing walls of the striker receiving slot at the second cross-sectional width of the front striker thereby establishing an interference fit between the front latch and the striker engagement portion when the vehicle seat is rotated about the front striker to the installed position,
   wherein the generally flat, angled engagement surface is oriented at an angle relative to a horizontal plane of the vehicle floor, the angle being between approximately 20° and approximately 40°.

2. The seat assembly of claim 1, wherein the angled, flat engagement surface is angled relative to and does not contact the opposed walls of the striker receiving slot when the vehicle seat is in the installed position.

3. The seat assembly of claim 1, wherein the angle is approximately 30°.

4. The seat assembly of claim 1, wherein the seat mounting bracket further includes a support member coupled between a first side member and a second side member.

5. The seat assembly of claim 4, wherein at least one of the first and second side members is stepped to define a lower surface, an intermediate surface, and an upper surface.

6. The seat assembly of claim 5, wherein the front striker is coupled to the intermediate surface, and the rear striker is coupled to the upper surface.

7. The seat assembly of claim 1, wherein the front striker includes a first leg coupled to the seat mounting bracket and a second leg coupled to the seat mounting bracket, wherein the engagement portion extends between the first leg and the second leg.

8. The seat assembly of claim 7, wherein the engagement portion is generally U-shaped.

9. The seat assembly of claim 8, wherein the engagement portion includes first and second stems extending respectively from the first and second legs, the first and second stems extending at an angle relative to the first and second legs.

10. The seat assembly of claim 1, wherein a cross-section of the engagement portion includes the generally flat, angled engagement surface, a generally rounded portion disposed between first and second sidewall portions, a second rounded portion disposed between the first sidewall portion and the generally flat, angled surface, and a third rounded portion disposed between the second sidewall portion and the generally flat, angled surface.

11. The seat assembly of claim 10, wherein the second cross-sectional width is defined between the generally rounded portion and the third rounded portion.

12. The seat assembly of claim 10, wherein the first cross-sectional width is defined between the generally flat, angled surface and an outermost point of the generally rounded portion.

13. A removable seat assembly for a vehicle, the seat assembly comprising:
  a vehicle seat having a front latch and a rear latch, the front latch including a striker receiving slot having a slot width; and
  a seat mounting bracket adapted to be coupled to a floor of the vehicle, the seat mounting bracket including a front striker and a rear striker, the front striker configured to be received in the striker receiving slot, and the rear striker configured to be received by the rear latch, the front striker comprising a front striker engagement portion including a generally flat, angled engagement surface in cross-section, wherein the engagement portion includes a first cross-sectional width in a direction perpendicular to the engagement surface that is less than a second, different cross-sectional width,
  wherein in an installation position of the vehicle seat where the seat is angled forward relative to the vehicle floor such that the rear latch is spaced apart from the rear striker, the front latch is configured to receive the engagement portion of the front striker such that the first cross-sectional width of the engagement portion is received in the striker receiving slot and the engagement surface is substantially parallel to the striker receiving slot thereby providing for a clearance fit between the front striker and the receiving slot when initially installing the vehicle seat, and
  wherein in an installed position of the vehicle seat where the rear latch is engaged with the rear striker, the striker receiving slot is angled relative to the striker engagement surface such that the front striker engages opposing walls of the striker receiving slot at the second cross-sectional width of the front striker thereby establishing an interference fit between the front latch and the striker engagement portion when the vehicle seat is rotated about the front striker to the installed position,
  wherein the seat mounting bracket further includes a support member coupled between a first side member and a second side member.

14. A removable seat assembly for a vehicle, the seat assembly comprising:
  a vehicle seat having a front latch and a rear latch, the front latch including a striker receiving slot having a slot width; and
  a seat mounting bracket adapted to be coupled to a floor of the vehicle, the seat mounting bracket including a front striker and a rear striker, the front striker configured to be received in the striker receiving slot, and the rear striker configured to be received by the rear latch, the front striker comprising a front striker engagement portion including a generally flat, angled engagement surface in cross-section, wherein the engagement portion includes a first cross-sectional width in a direction perpendicular to the engagement surface that is less than a second, different cross-sectional width,
  wherein in an installation position of the vehicle seat where the seat is angled forward relative to the vehicle floor such that the rear latch is spaced apart from the rear striker, the front latch is configured to receive the engagement portion of the front striker such that the first cross-sectional width of the engagement portion is received in the striker receiving slot and the engagement surface is substantially parallel to the striker receiving slot thereby providing for a clearance fit between the front striker and the receiving slot when initially installing the vehicle seat, and
  wherein in an installed position of the vehicle seat where the rear latch is engaged with the rear striker, the striker receiving slot is angled relative to the striker engagement surface such that the front striker engages opposing walls of the striker receiving slot at the second cross-sectional width of the front striker thereby establishing an interference fit between the front latch and the striker engagement portion when the vehicle seat is rotated about the front striker to the installed position,
  wherein the front striker includes a first leg coupled to the seat mounting bracket and a second leg coupled to the seat mounting bracket, wherein the engagement portion extends between the first leg and the second leg,
  wherein the engagement portion includes first and second stems extending respectively from the first and second legs, the first and second stems extending at an angle relative to the first and second legs.

* * * * *